United States Patent
Suzuki et al.

(10) Patent No.: US 10,140,976 B2
(45) Date of Patent: Nov. 27, 2018

(54) DISCRIMINATIVE TRAINING OF AUTOMATIC SPEECH RECOGNITION MODELS WITH NATURAL LANGUAGE PROCESSING DICTIONARY FOR SPOKEN LANGUAGE PROCESSING

(71) Applicant: INTERNATIONAL BUSINESS MACHINES CORPORATION, Armonk, NY (US)

(72) Inventors: Masayuki Suzuki, Koto-ku (JP); Nobuyasu Itoh, Kanagawa (JP); Gakuto Kurata, Tokyo (JP); Tohru Nagano, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 14/968,439

(22) Filed: Dec. 14, 2015

(65) Prior Publication Data
US 2017/0169813 A1    Jun. 15, 2017

(51) Int. Cl.
*G06F 17/27* (2006.01)
*G10L 15/06* (2013.01)
(Continued)

(52) U.S. Cl.
CPC .......... *G10L 15/063* (2013.01); *G06F 17/277* (2013.01); *G06F 17/2735* (2013.01);
(Continued)

(58) Field of Classification Search
CPC ....... G10L 15/063; G10L 15/00; G10L 15/04; G10L 15/05; G10L 15/08; G10L 15/18;
(Continued)

(56) References Cited

U.S. PATENT DOCUMENTS 7,272,560 B2 * 9/2007 Abrego ................. G10L 15/187
704/244
8,301,437 B2 * 10/2012 Parikh ................. G06F 17/2735
704/2
(Continued)

FOREIGN PATENT DOCUMENTS

WO    2015026366    2/2015

OTHER PUBLICATIONS

Yaman, S., An Integrative and Discriminative Technique for Spoken Utterance Classification, in Audio, Speech, and Language Processing, IEEE Transactions on , vol. 16, No. 6, pp. 1207-1214, Aug. 2008.
(Continued)

*Primary Examiner* — Richard Zhu
(74) *Attorney, Agent, or Firm* — Tutunjian & Bitetto, P.C.; Vazken Alexanian

(57) ABSTRACT

Methods and systems for language processing includes training one or more automatic speech recognition models using an automatic speech recognition dictionary. A set of N automatic speech recognition hypotheses for an input is determined, based on the one or more automatic speech recognition models, using a processor. A best hypothesis is selected using a discriminative language model and a list of relevant words. Natural language processing is performed on the best hypothesis.

18 Claims, 3 Drawing Sheets

(51) Int. Cl.
*G10L 15/01* (2013.01)
*G10L 15/197* (2013.01)
*G10L 15/26* (2006.01)

(52) U.S. Cl.
CPC ............ *G10L 15/01* (2013.01); *G10L 15/197* (2013.01); *G10L 15/26* (2013.01); *G10L 2015/0635* (2013.01); *G10L 2015/0638* (2013.01)

(58) Field of Classification Search
CPC ... G10L 15/1815; G10L 15/19; G10L 15/193; G10L 15/197
See application file for complete search history.

(56) References Cited

U.S. PATENT DOCUMENTS

| | | | |
|---|---|---|---|
| 8,965,763 B1 | 2/2015 | Chelba et al. | |
| 9,292,487 B1* | 3/2016 | Weber | G06F 17/27 |
| 2004/0236575 A1* | 11/2004 | Goronzy | G10L 15/08 |
| | | | 704/231 |
| 2005/0228667 A1* | 10/2005 | Duan | G10L 15/197 |
| | | | 704/256 |
| 2006/0277033 A1* | 12/2006 | Gao | G10L 15/197 |
| | | | 704/10 |
| 2007/0005206 A1* | 1/2007 | Zhang | G06F 3/16 |
| | | | 701/36 |
| 2008/0091423 A1* | 4/2008 | Roy | G10L 15/26 |
| | | | 704/235 |
| 2009/0258333 A1* | 10/2009 | Yu | G09B 5/04 |
| | | | 434/157 |
| 2011/0131038 A1* | 6/2011 | Oyaizu | G10L 15/06 |
| | | | 704/10 |
| 2013/0289900 A1 | 10/2013 | Fry | |
| 2014/0142925 A1* | 5/2014 | Gish | G10L 15/063 |
| | | | 704/10 |
| 2014/0195238 A1* | 7/2014 | Terao | G10L 15/02 |
| | | | 704/251 |
| 2014/0278426 A1* | 9/2014 | Jost | G10L 15/063 |
| | | | 704/257 |
| 2015/0088499 A1 | 3/2015 | White et al. | |
| 2015/0278192 A1* | 10/2015 | Bretter | G06F 17/2785 |
| | | | 704/9 |

OTHER PUBLICATIONS

He, Xiaodong, Speech-Centric Information Processing: An Optimization-Oriented Approach, Proceedings of the IEEE , vol. 101, No. 5, pp. 1116-1135, May 2013.

Gales, Mark, Structured Discriminative Models for Speech Recognition, in Signal Processing Magazine, IEEE , vol. 29, No. 6, pp. 70-81, Nov. 2012.

* cited by examiner

DISCRIMINATIVE TRAINING OF AUTOMATIC SPEECH RECOGNITION MODELS WITH NATURAL LANGUAGE PROCESSING DICTIONARY FOR SPOKEN LANGUAGE PROCESSING

BACKGROUND

Technical Field

The present invention relates to speech recognition and, more particularly, to performing natural language processing on inputs that have been acquired by automatic speech recognition.

Description of the Related Art

Automatic speech recognition is widely used to quickly accept spoken input from users. The user's speech is recorded and matched to a set of most likely words and phrases, rendering the audio data into text data. This data may then be analyzed using natural language processing to, for example, execute a command or query contained in the user's speech. However, performing natural language processing on the results of automatic speech recognition can be difficult, as the speech recognition and language processing systems are frequently developed separately and use different dictionaries. This can produce inaccurate results, as errors that are recognized by the automatic speech recognition system may not affect information that is relevant to the meaning of the speech, causing an inferior hypothesis to be selected for natural language processing.

SUMMARY

A method for language processing includes training one or more automatic speech recognition models using an automatic speech recognition dictionary. A set of N automatic speech recognition hypotheses that characterize a spoken input is determined, based on the one or more automatic speech recognition models, using a processor. A hypothesis is selected from the set of N automatic speech recognition hypotheses using a discriminative language model and a list of relevant words according to an error rate of relevant words in each hypothesis.

A method for language processing includes training one or more automatic speech recognition models using an automatic speech recognition dictionary. A set of N automatic speech recognition hypotheses for an input is determined, based on the one or more automatic speech recognition models, using a processor. A hypothesis is selected from the set of N automatic speech recognition hypotheses using a discriminative language model and a list of relevant words according to an error rate of relevant words in each hypothesis. Determining the hypotheses includes concatenating all words in the natural language processing training data to generate raw natural language processing text, tokenizing the raw natural language processing text using the automatic speech recognition dictionary, collecting tokenized words that appear more than a threshold number of times, and adding entries of a natural language processing dictionary to the collected tokenized words to form the relevant word list. Selecting the best hypothesis includes determining a relevant word error rate for each hypothesis that considers only words that are on the relevant word list using the discriminative language model, selecting the hypothesis having the lowest relevant word error rate, and performing natural language processing on the best hypothesis.

A system for language processing includes an automatic speech recognition module comprising a processor configured to train one or more automatic speech recognition models using an automatic speech recognition dictionary, to determine a set of N automatic speech recognition hypotheses that characterize a spoken input based on the one or more automatic speech recognition models, and to select a hypothesis from the set of N automatic speech recognition hypotheses using a discriminative language model and a list of relevant words according to an error rate of relevant words in each hypothesis. A natural language processing module is configured to perform natural language processing on the best hypothesis.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention create a natural language processing dictionary that is based on an automatic speech recognition dictionary. Words that are not relevant to the meaning of an utterance are trimmed out of the dictionary and this set of relevant words is used to select the output of the automatic speech recognition. A language model is used that minimizes the error rate of relevant words, rather than overall word error rate, before passing a best hypothesis to natural language processing. This provides superior natural language processing results.

In one example, a user asks for directions to a particular train station. The most accurate transcription of a user's query may be, for example, "Well, where is the Bayside station?" Automatic speech recognition will create a set of hypotheses in an attempt to accurately represent this phrase, usually having one or more inaccuracies. The automatic speech recognition system is trained by comparing the hypotheses from known phrases to a transcription of those phrases. Two exemplary hypotheses output by the automatic speech recognition process include:

1. "Well, where is the Woodside station?"
2. "Uh, where is the, ah, Bayside station?"

Errors in speech recognition are shown as being underlined. In the first hypothesis, compared to the transcription, there is a word error rate of ⅙. In the second hypothesis, compared to the transcription, there is a word error rate of ⅖. The naïve approach is to use the hypothesis having a lower word error rate for natural language processing. However, as the above example shows, the hypothesis with the higher word error rate may have the more accurate natural language interpretation. As a result of this problem, the naïve approach that includes irrelevant words during training can produce erroneous results, in this case giving directions to an entirely different location.

To address this difficulty, the present invention uses a dictionary for natural language processing that is based on word units from the automatic speech recognition system. The automatic speech recognition dictionary is used to tokenize training data of the natural language processing system to create a list of relevant words that have a higher likelihood of being meaningful to the natural language interpretation.

Figure 1:
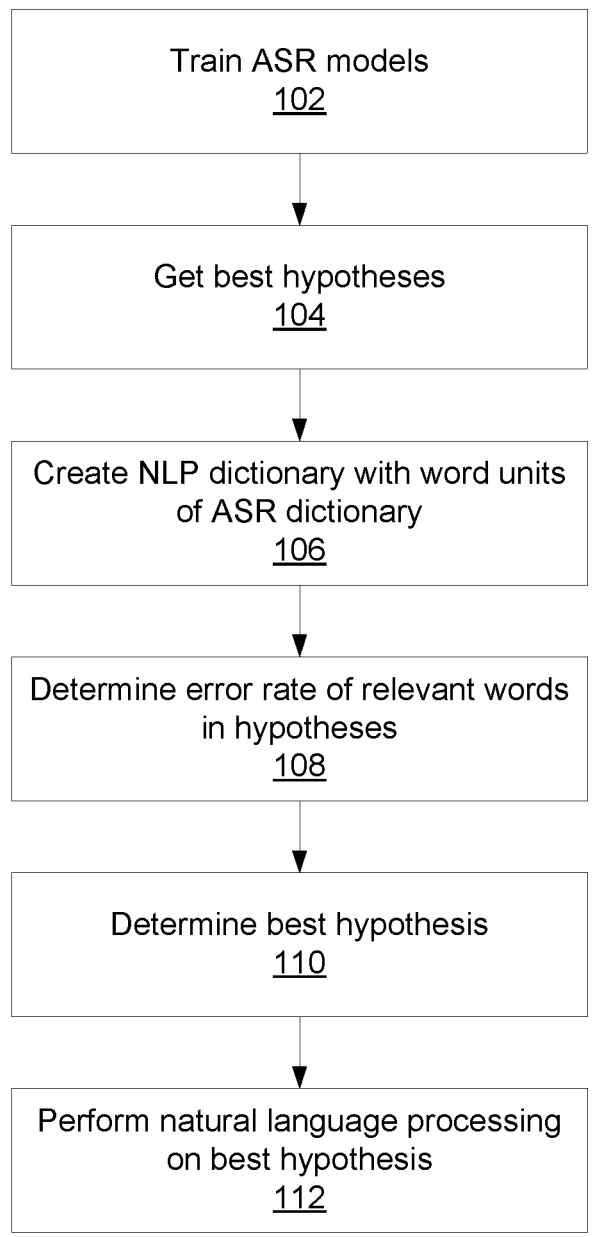
FIG. 1 is a block/flow diagram of a method of performing natural language processing in accordance with the present principles.

Referring now to the drawings in which like numerals represent the same or similar elements and initially to FIG. 1, a method for natural language processing on automatically recognized speech data is shown. Block 102 trains automatic speech recognition models, including, e.g., a language model and an acoustic model. The training is performed according to a speech recognition dictionary and speech recognition training data. These models are used by block 104 to generate a set of N best hypotheses for a spoken input.

Block 106 creates a first natural language processing dictionary with word units from the automatic speech recognition dictionary. This first natural language processing dictionary is used in block 108 to determine whether words in each hypothesis are relevant, finding the error rate in only the relevant words. following the above example, this step would ignore utterances such as "uh," and, "ah," as these have little likely effect on the natural language processing outcome.

Block 110 then determines the best hypothesis, measured as the hypothesis having the lowest error rate among relevant words. Block 112 performs natural language processing on the best hypothesis using a discriminative language model and a natural language processing model that is trained on a second natural language processing dictionary and training data. The discriminative language model is trained using training data that includes the word error rates based on the first natural language processing dictionary, which in turn are based on automatic speech recognition hypotheses and transcriptions. The trained discriminative language model therefore selects a hypothesis having a word error rate of relevant words that is lowest. This stands in contrast to conventional approaches, which minimize the word error rate of all words—including irrelevant words. The determination of the best hypothesis in block 110 may alternatively be performed using an acoustic model and/or language model that is re-trained using the dictionary of relevant words.

The creation of the first natural language processing dictionary in block 106 can be accomplished by any appropriate method. In one example, an off-the-shelf natural language processing dictionary may be used. In a second example, a manually created dictionary using, for example, only the noun words of an off-the-shelf dictionary may be used. These contrast to general purpose automated speech recognition dictionaries in part by being much smaller, excluding many of the words and other recognizable sounds that automated speech recognition looks for, but which are less important (or unimportant) to the meaning of the utterance. Notably, the first natural language processing dictionary is not used to extract meaning from the utterance, but rather is used to characterize the error rates of the hypotheses of the automatic speech recognition.

Figure 2:
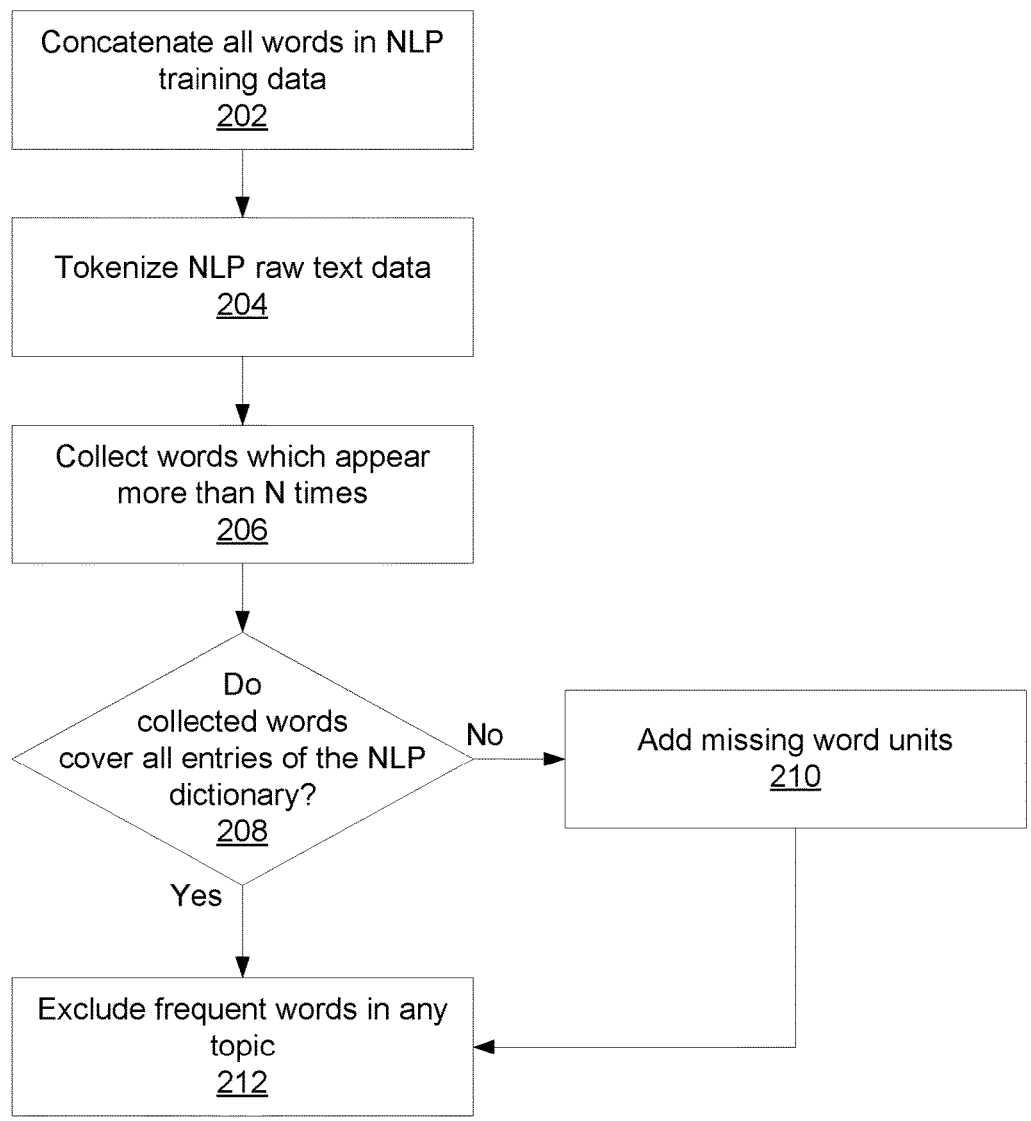
FIG. 2 is a block/flow diagram of a method of creating a dictionary of relevant works in accordance with the present principles.

Referring now to FIG. 2, a particular method for creating the first natural language processing dictionary is shown. Block 202 concatenates all of the words in a set of natural language processing training data, using the raw text. Block 204 then tokenizes the raw text using an automatic speech recognition dictionary and a word n-gram model based on the automatic speech recognition dictionary.

Block 206 collects the words from the tokenized text and unknown words which appear more than N times to form the dictionary base. Block 208 then determines whether the collected words from block 206 cover all of the entries of the natural language dictionary (e.g., an off-the-shelf natural language processing dictionary, for example such as is used for automated Question/Answer systems). If not, block 210 adds the missing word units. If so, block 212 then excludes frequent words which appear in any topic (e.g., the word "the," which is extremely common and provides little discriminatory value).

Adding missing word units in block 210 is of particular importance for languages, such as Japanese and Chinese, which do not have spaces between words. In these languages, there may be multiple definitions for a single word unit. In one example, the Japanese word for "sorry" can be split into two separate word units. If the dictionary includes the total word and only one of the component word units, then block 210 may fill in the remaining word unit(s) to complete the dictionary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
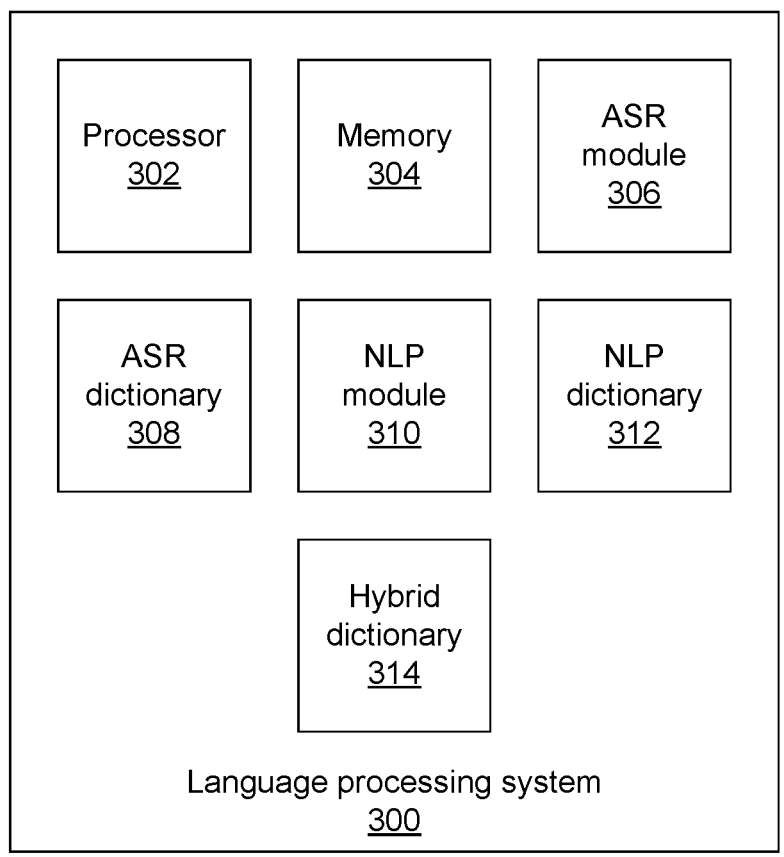
FIG. 3 is a block diagram of a system for performing natural language processing in accordance with the present principles.

Referring now to FIG. 3, a language processing system 300 is shown. The language processing system 300 includes a hardware processor 302 and memory 304. The system 300 further includes a set of functional modules that may, in one embodiment, be implemented as software running on the hardware processor 302. In an alternative embodiment, these modules may be implemented as one or more discrete hardware components in the form of, for example, an application specific integrated chip or a field programmable gate array.

The language processing system 300 includes an automatic speech recognition module 306 and a natural language processing module 310, each having respective dictionaries 308 and 312. In addition, a hybrid dictionary 314 is formed using word units from the automatic speech recognition dictionary 308 to form a list of relevant words. During operation, the automatic speech recognition module 306 forms a set of best hypotheses. Based on the hybrid dictionary 314, a best hypothesis is selected by considering only the relevant words in the hypotheses. The natural language processing module 310 then operates on the best hypothesis to produce an output phrase that most closely matches the meaning intended by the speaker.

Having described preferred embodiments of discriminative training of automatic speech recognition models with a natural language processing dictionary for spoken language processing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for language processing, comprising:
    training one or more automatic speech recognition models using an automatic speech recognition dictionary and speech recognition training data;
    determining a set of N automatic speech recognition hypotheses that characterize a spoken input, based on the one or more automatic speech recognition models, using a processor;
    selecting a hypothesis from the set of N automatic speech recognition hypotheses using a discriminative language model and a first natural language processing dictionary that excludes words having little discriminatory value according to an error rate of only words other than words having little likely effect on the natural language outcome in each hypothesis; and
    performing natural language processing on the selected hypothesis using a second natural language processing dictionary that is different from the automatic speech recognition dictionary and the first natural language processing dictionary.

2. The method for language processing of claim 1, further comprising determining the first natural language processing dictionary using natural language processing training data and the automatic speech recognition dictionary by trimming out words having little likely effect on the natural language outcome from the automatic speech recognition dictionary.

3. The method for language processing of claim 2, wherein determining the first natural language processing dictionary comprises concatenating all words in the natural language processing training data to generate raw natural language processing text.

4. The method for language processing of claim 3, further comprising tokenizing the raw natural language processing text using the automatic speech recognition dictionary.

5. The method for language processing of claim 4, further comprising collecting tokenized words that appear more than a threshold number of times.

6. The method for language processing of claim 1, wherein selecting the hypothesis comprises determining a word error rate for each hypothesis that considers only errors in words of the respective hypothesis that are in the first natural language processing dictionary using the discriminative language model.

7. The method for language processing of claim 6, further comprising selecting the hypothesis having the lowest word error rate.

8. The method for language processing of claim 1, wherein training the one or more automatic speech recognition models comprises training an acoustic model and a language mode.

9. A computer readable storage medium comprising a computer readable program for language processing, wherein the computer readable program when executed on a computer causes the computer to perform the steps of claim 1.

10. A method for language processing, comprising:
    training one or more automatic speech recognition models using an automatic speech recognition dictionary and speech recognition training data;
    determining a set of N automatic speech recognition hypotheses that characterize a spoken input, based on the one or more automatic speech recognition models, using a processor, comprising:
    concatenating all words in the natural language processing training data to generate raw natural language processing text;
    tokenizing the raw natural language processing text using the automatic speech recognition dictionary;
    collecting tokenized words that appear more than a threshold number of times; and
    forming a first natural language processing dictionary that excludes words having little discriminatory value using the collected tokenized words;
    selecting a hypothesis from the set of N automatic speech recognition hypotheses using a discriminative language model and the first natural language processing dictionary input according to an error rate of only words other than words having little likely effect on the natural language processing outcome in each hypothesis, said selection comprising:
        determining a word error rate for each hypothesis that considers only the first natural language processing dictionary using the discriminative language model; and
        selecting the hypothesis having the lowest word error rate; and
    performing natural language processing on the selected hypothesis using a second natural language processing dictionary that is different from the automatic speech recognition dictionary and the first natural language processing dictionary.

11. A system for language processing, comprising:
    an automatic speech recognition module comprising a processor configured to train one or more automatic speech recognition models using an automatic speech recognition dictionary and speech recognition training data, to determine a set of N automatic speech recognition hypotheses that characterize a spoken input based on the one or more automatic speech recognition models, and to select a hypothesis from the set of N automatic speech recognition hypotheses using a discriminative language model and first natural language processing dictionary that excludes words having little discriminatory value according to an error rate of only words other than words having little likely effect on the natural language processing outcome in each hypothesis; and
    a natural language processing module configured to perform natural language processing on the selected hypothesis using a second natural language processing dictionary that is different from the automatic speech recognition dictionary and the first natural language processing dictionary.

12. The system of claim 11, wherein the automatic speech recognition module is further configured to determine the first natural language processing dictionary using natural language processing training data and the automatic speech recognition dictionary by trimming out words having little likely effect on the natural language outcome from the automatic speech recognition dictionary.

13. The system for language processing of claim 12, wherein the automatic speech recognition module is further configured to concatenate all words in the natural language processing training data to generate raw natural language processing text.

14. The system for language processing of claim 13, wherein the automatic speech recognition module is further configured to tokenize the raw natural language processing text using the automatic speech recognition dictionary.

15. The system for language processing of claim 14, wherein the automatic speech recognition module is further configured to collect tokenized words that appear more than a threshold number of times.

16. The system for language processing of claim 11, wherein the automatic speech recognition module is further configured to determine a word error rate for each hypothesis that considers only errors in words of the respective hypothesis that are in the first natural language processing dictionary using the discriminative language model.

17. The system for language processing of claim 16, wherein the automatic speech recognition module is further configured to select the hypothesis having the lowest word error rate.

18. The system for language processing of claim 11, wherein the automatic speech recognition module is further configured to train an acoustic model and a language mode.

* * * * *